(12) United States Patent  
Mack

(10) Patent No.: US 7,518,098 B2  
(45) Date of Patent: Apr. 14, 2009

(54) OPTOELECTRONIC DUST SENSOR DEVICE

(75) Inventor: Bernd Mack, Esslingen (DE)

(73) Assignee: Odelo GmbH, Esslingen (DE)

( * ) Notice: Subject to any disclaimer, the term of this patent is extended or adjusted under 35 U.S.C. 154(b) by 323 days.

(21) Appl. No.: 11/191,872

(22) Filed: Jul. 28, 2005

(65) Prior Publication Data

US 2006/0022836 A1 Feb. 2, 2006

(30) Foreign Application Priority Data

Jul. 30, 2004 (DE) .................. 10 2004 038 422

(51) Int. Cl.
*H01J 40/14* (2006.01)
*G02B 27/00* (2006.01)

(52) U.S. Cl. ..................... 250/221; 250/551
(58) Field of Classification Search ............. 250/221, 250/551, 227.25, 573
See application file for complete search history.

(56) References Cited

U.S. PATENT DOCUMENTS

| 4,354,106 | A | * | 10/1982 | Walter ................... 250/239 |
| 4,701,613 | A | | 10/1987 | Watanabe et al. |
| 4,769,535 | A | * | 9/1988 | Sasaki et al. ............ 250/221 |
| 5,214,495 | A | * | 5/1993 | Kitanishi .................. 257/80 |
| 5,729,250 | A | * | 3/1998 | Bishop et al. ............ 345/175 |

FOREIGN PATENT DOCUMENTS

| DE | 697 14 547 T 2 | 3/2003 |
| EP | 0 249 031 A | 12/1987 |
| EP | 0 412 653 A | 2/1991 |
| EP | 0 482 006 B1 | 2/1994 |
| EP | 0 947 402 A2 | 10/1999 |
| EP | 1 026 496 A1 | 8/2000 |
| EP | 1 087 221 A | 3/2001 |
| EP | 1 431 142 A2 | 6/2004 |
| FR | 2 722 291 A1 | 1/1996 |
| JP | 63240082 A | * 10/1988 |
| JP | 02216899 A | * 8/1990 |
| WO | WO 92/18848 | 10/1992 |

OTHER PUBLICATIONS

W. Robel, G. Gruhler, D. Haas, et al., XP-000937949, Advanced Microsystems for Automotive Applications, Springer, DE, 1999, p. 154-156.

* cited by examiner

*Primary Examiner*—Thanh X Luu
(74) *Attorney, Agent, or Firm*—Laurence A. Greenberg; Werner H. Stemer; Ralph E. Locher

(57) ABSTRACT

The invention is based on a sensor device having at least one transmitter unit situated inside a sensor body, a receiver unit associated with the transmitter unit and situated inside the sensor body, and an end face that is situated between the transmitter unit and receiver unit and constitutes a boundary surface of the sensor body. According to a first aspect of the invention, it is possible to achieve a compact embodiment with low requirements for assembly-related production tolerances if the transmitter unit and/or the receiver unit is/are comprised of an injection molded part with an incorporated radiation transmitter and/or radiation receiver. According to another aspect of the invention, a radiation transmitted from the transmitter unit to the receiver unit essentially travels in a beam path outside the sensor body. The invention also relates to a use of a sensor device and a vehicle light.

2 Claims, 3 Drawing Sheets

OPTOELECTRONIC DUST SENSOR DEVICE

CROSS-REFERENCE TO RELATED APPLICATIONS

This application claims priority to German Patent Application No. 10 2004 038 422.3-52 filed Jul. 30, 2004.

TECHNICAL FIELD

The invention is based on a sensor device, a use of a sensor device and a vehicle light.

BACKGROUND OF THE INVENTION

It is known to use optoelectronic sensor devices as dirt detectors. Usually, a sensor device of this kind is comprised of a radiation-conducting sensor body that contains at least one radiation transmitter that projects test light in the form of a parallel radiation beam through a test surface provided on the sensor body to at least one radiation receiver. Dirt deposited on the test surface influences the intensity of the radiation received by the radiation receiver. Patent application DE 197 13 910 C1 has disclosed a sensor device in which the production and focusing of the parallel test light occurs inside the sensor body. In order to achieve a low structural height, the test light is totally reflected against the circumference surface of the sensor body; at the same time, the circumference surface is designed so that the radiation beam emitted by the radiation transmitter is sufficiently focused and is conveyed to the radiation receiver. The transmitter unit and the receiver unit must therefore be adjusted to a correspondingly precise degree when they are mounted in the sensor device.

The object of the invention is to produce a sensor device that permits a compact design while having low requirements with regard to installation-related tolerances, and to disclose a use of the sensor device as well as a vehicle light.

SUMMARY OF THE INVENTION

The sensor device according to the invention has at least one transmitter unit contained in a sensor body, a receiver unit associated with the transmitter unit and contained in the sensor body, and a test surface situated between the transmitter unit and the receiver unit.

According to a first aspect of the invention, the transmitter unit and/or the receiver unit are comprised of an injection molded part with a radiation transmitter and/or radiation receiver incorporated into it; the test surface is comprised of an exit surface of the transmitter unit and an entrance surface of the receiver unit. This makes it possible not only to detect dirt adhering to the test surface, but also to analyze the volume between the exit test surface and the entrance test surface. This makes it possible, for example, to detect mist or smoke. The injection molded part contains essential optical components of the transmitter unit and/or receiver unit such as reflectors, lenses, and the like, and can be shaped independently of the actual sensor body, which can be limited to a simple carrying function. The optical components, which are integrated into the injection molded part comprising the transmitter unit and/or receiver unit, can already be oriented and adjusted as part of the manufacture of the injection molded part and thus completely independently of the sensor body of the sensor device. It is thus possible to advantageously fulfill complex measurement tasks that are integrated into larger systems. In particular, it is possible for a beam path to extend outside the sensor body. Expensive optical devices in the actual sensor body, such as mirrored surfaces, lenses, and the like can be omitted. The sensor device can be embodied within considerable design latitudes since the optical properties of the sensor device are decoupled from the sensor body. Very high-quality optical components can be produced by means of an injection molding process.

Preferably, several transmitter units and/or several receiver units and/or a combination of one or more transmitter units and one or more receiver units are contained inside an injection molded part.

According to another aspect of the invention, a radiation transmitted from the transmitter unit to the receiver unit essentially travels in a beam path outside the sensor body; the test surface is constituted by an exit surface of the transmitter unit and an entrance surface of the receiver unit. Since the exit surface of the transmitter unit and the entrance surface of the receiver unit constitute the test surface for radiation, it is possible not only to detect dirt adhering to the test surface, but also to analyze the volume between the exit test surface and the entrance test surface. This makes it possible, for example, to detect mist or smoke. The exit surface and entrance surface are preferably situated within an end face of the sensor body. A deposit on the exit surface and/or entrance surface results in a reduction in the radiation transmitted via the beam path, which is detected as dirt. In addition, the measurement precision is proportional to the size of the test surface. It is thus advantageous to increase the size of the exit surface and entrance surface until they take up the greatest possible proportion of the sensor area and/or to insert an additional test surface into the beam path. In this case, the test surface can be increased in size without having to increase the diameter of the sensor body. In particular, transmitter units and/or receiver units, which are equipped with integrated optics and embodied in the form of injection molded parts, assure that the sensor body can be advantageously decoupled from the beam path.

The sensor body itself can be kept free of optically effective surfaces, in particular, it is no longer necessary to embody outer circumference surfaces of the sensor body as reflectors. The assembly of the sensor device is significantly simplified since it is no longer necessary to adjust the optical elements with regard to the transmitter unit and receiver unit during assembly of the sensor device. Instead, the optical devices of the transmitter unit and/or receiver unit are independent of the sensor body. This allows the sensor body to be embodied in any shape, in particular it can be embodied as very flat. This also improves measurement precision since it eliminates adjustment errors during assembly. Likewise, the sensor body does not need to be embodied in the form of a light-guiding body. It can, if needed, also be only partially permeable or even entirely impermeable to the radiation used. The sensor body can be embodied independently of a set of measurement equipment comprised of a transmitter unit and receiver unit. The sensor body is advantageously situated with its circumference surface outside the beam path so that the radiation transmitted from the transmitter unit to the receiver unit is not or does not have to be reflected against the circumference surface.

Preferably, the transmitter unit has a radiation source with an integrated optical device and/or the receiver unit has a radiation receiver with an integrated optical device. The transmitter unit and/or the receiver unit is/are each individually embodied as a module and provided with a separate set of optics, which is independent of the sensor body. An optical adjustment is advantageously independent of the sensor body and can be carried out individually for the transmitter unit and/or the receiver unit. Preferably, the transmitter unit and/or the receiver unit are each comprised of a semiconductor chip with optics adapted to it, which is inserted into the sensor body and injection molded into it. Preferably, the radiation transmitter is an LED, in particular an infrared-emitting LED, and the radiation receiver is a light-sensitive element, preferably a PIN diode. The transmitter unit and/or the receiver unit is then attached to the sensor body without having to take into account its optical properties and the sensor body still simultaneously protects it from damage and dirt, even in severe operating conditions. The sensor body essentially serves as a holder for the transmitter unit and receiver unit.

If the transmitter unit has a radiation transmitter that is encompassed in close proximity by an optically effective surface, then the transmitter unit can be manufactured, assembled, and operated as a module, independent of the optical properties of the sensor body; the assembly is advantageously facilitated since it is no longer necessary to carry out a precise adjustment of the radiation transmitter and its associated optically effective surfaces, particularly for purposes of reflection and/or parallelization and/or the emission of radiation from the transmitter unit since the radiation transmitter and the optically effective surfaces, together with the transmitter unit, comprise a single unit that can be attached as a whole to the sensor body.

If the receiver unit has a radiation receiver that is encompassed in close proximity by an optically effective surface, then the receiver unit can be operated as a module, independent of the optical properties of the sensor body; the assembly is advantageously facilitated since it is no longer necessary to carry out a precise adjustment of the radiation receiver and its associated optically effective surfaces, particularly for purposes of reflection and/or parallelization and/or the entrance of radiation into the receiver unit since the radiation receiver and the optically effective surfaces, together with the receiver unit, comprise a single unit that can be attached as a whole to the sensor body.

Preferably, a radiation-guiding body is situated within the optically effective surface of the transmitter unit and/or receiver unit; in a particularly preferable embodiment, the radiation-guiding body is separate from the sensor body, thus rendering the radiation-guiding body essentially independent of the properties of the sensor body. The radiation-guiding body and the optically effective surface of the transmitter unit serve to parallelize a radiation beam emitted by the radiation transmitter and thus to distribute it onto the associated exit surface, which functions as a test surface, in such a way that the beam is projected as completely as possible via the beam path onto the associated receiver unit entrance surface, which also serves as a test surface. In order to achieve a high degree of measurement precision of the sensor device according to the invention, it is very advantageous to have a distribution onto the test surfaces that is as homogeneous as possible and a transmission of the radiation beam with the lowest possible loss, in particular a prevention of stray radiation. Conversely, it is the task of the radiation-guiding body and the optically effective surface of the receiver unit to take the radiation beam striking the measurement surface and focus it onto an active surface of the radiation receiver. There are a number of conceivable variations of this, for example to provide only the radiation-guiding body or only the optically effective surfaces, particularly if an available test surface is provided separate from the exit surface of the transmitter unit and/or the entrance surface of the receiver unit, or also to provide a combination of the two in the receiver unit and/or the transmitter unit.

In a preferred embodiment, both the transmitter unit and the receiver unit are embodied in this way and integrated into the sensor body. It is also within the scope of the present invention for only the transmitter unit or only the receiver unit to be embodied in this way and integrated into the sensor body.

A particularly flat design results if the transmitter unit and/or the receiver unit are situated in a region close to the surface of the end face. The sensor body can be embodied practically independently of the transmitter unit and/or receiver unit. Preferably, several transmitter units and receiver units can be situated in the end face. They can advantageously be arranged in a circle, for example when the sensor body is round. It is also within the scope of the present invention to arrange transmitter units and/or receiver units, for example parallel to one another in a single line. This makes it possible to achieve optimized measurement conditions for various measurement tasks. The modular design of the transmitter units and receiver units and the decoupling of the optically effective surfaces and the light-guiding body from the sensor body makes it possible to sharply reduce the size of the sensor device. The assembly plans can be simplified; the design and connecting techniques are simplified.

The radiation exit surface of the transmitter unit and/or the radiation entrance surface of the receiver unit can be essentially flush with the end face. For example, after the assembly of the transmitter unit and/or receiver unit, the end face can be completely re-engineered. It is also within the scope of the present invention for the transmitter unit and/or receiver unit to be oriented at angle to the end face. This can be selected as a function of the intended measurement apparatus and/or its use, in order to detect deposits on the test surface and/or a state of this test surface.

In a preferable modification, between the transmitter unit and receiver unit, at least one isolated protrusion on the end face is situated so that radiation transmitted by the transmitter unit and striking the receiver unit passes through the protrusion. The protrusion can preferably be formed onto it or can also be attached to it. In a suitable manner, the sensor body is then at least partially permeable to the radiation of the transmitter unit. The protrusion increases the size of the test surface, thus increasing the measurement sensitivity and measurement precision. Optionally, several such protrusions, for example embodied in the form of rings, can be provided between the transmitter unit and receiver unit in order to increase the size of the test surface. It is particularly advantageous if the protrusions are taken into consideration in an optical design and in particular, are included in a calculation of the optical properties. This can improve the measurement precision without increasing the deviation of the sensor device. It is thus possible to produce a sensor device, which, while having a high degree of measurement precision and resolution, is very small and compact.

If the protrusion is situated around a symmetry axis and the transmitter unit and receiver unit are situated on opposite sides of the symmetry axis, then the protrusion can be embodied, for example, in the form of an annular bead situated symmetrically around this symmetry axis. A mold for producing the sensor body or its end face can be simply designed; in particular, the end face can be produced by means of milling and/or can be a turned part.

Optionally, the sensor body can be produced as a cast part or an injection molded part, with a correspondingly embodied casting mold or injection mold. In a preferable modification, one or more transmitter units and/or one or more receiver units and the sensor body are integrated into a single injection molded part.

Optionally, a number of transmitter units and receiver units can be situated along the circumference of the sensor body; preferably a transmitter unit cooperates with a receiver unit situated opposite from it on the end face.

Basically, the sensor body can be embodied in any shape, for example disk-shaped; its diameter is at least as great as its height and is preferably distinctly greater than its height, or alternatively is arbitrarily shaped. Those skilled in the art will select a suitable shape from an optical standpoint or in accordance with a desired concept for the entire system, for example in a vehicle with a sensor device according to the invention, whose appearance could be negatively affected by an excessively large sensor device. Likewise, a suitable embodiment is selected to suit a particular intended use and, for example when used in a vehicle, offers an easily accessible surface that is simple to clean by means of conventional cleaning devices such as a washer system and therefore offers a surface that is representative, for example, of the current degree of soiling.

The end face and/or the sensor body can be freely embodied as needed. Preferably, the end face and/or the sensor body have a free-form cross section; for example a round, oval, or polygonal cross section can be provided.

Preferably, the sensor device is inserted into a vehicle component and, in a particularly preferable embodiment, is integrated into a vehicle headlight. An alternative preferred embodiment is a tail light or headlight with an integrated sensor device. It is thus possible, for example, to advantageously adapt the luminosity of a headlight as a function of the degree to which it is soiled or coated or to optionally trigger a cleaning procedure as a function of a signal of the sensor device. For example, a headlight washing device can be activated or an alarm can alert the driver that a headlight is dirty.

In another alternate embodiment, additional sensors, for example a luminosity sensor, or a functional unit such as a functional light signal unit of a tail light, can be integrated into the sensor body. In particular, the sensor device can be combined with at least one other sensor, for example a range sensor, to form a sensor device. Likewise, the sensor device itself can be integrated into a sensor or a functional unit. This allows the sensor device to simultaneously be part of a larger system such as a lens of a vehicle tail light or another vehicle light. It is particularly advantageous if the sensor device or a component of it is embodied as an injection molded part and is integrated into a larger system and the properties of this injection molded part are taken into account in a calculation of the optical beam path of the larger system, for example the above-mentioned lens of a tail light. It is preferable for the sensor device to be used in or together with another sensor, in particular a luminosity sensor; in a sensor apparatus; or in a system, in particular a lens of a vehicle light; or for it to be integrated into or situated together with a functional unit, in particular a functional light signal unit.

It is also possible to produce a compact device if an evaluation unit for the sensor signals is integrated into the sensor device.

In another alternate embodiment, a number of radiation transmitters and/or receiver units are situated inside a transmitter unit and/or a receiver unit. It is also advantageous if a transmitter unit is associated with several receiver units and/or a receiver unit is associated with several transmitter units. The beam path is then distributed from one optical device to several of them, from several optical devices to one of them, or from several optical devices to several of them. This makes it possible to increase the sensitivity of the sensor device and permits a large number of measurement tasks to be fulfilled under an extremely wide range of geometric boundary conditions.

The sensor device can advantageously have elements irrelevant to the actual optical sensor function situated outside the region of the end face of the sensor in order to accommodate the needs of a design or satisfy desires in terms of appearance. It is also possible for elements irrelevant to function of the optical sensor and/or elements neutral to the function of the sensor, for example an emblem, to be attached to the end face or mounted onto it, even internally. The elements can be transparent, partially transparent, or even impermeable to the radiation used in the sensor device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Other advantages ensue from the following description of the drawings. The drawings show exemplary embodiments of the invention. The drawings, the specification, and the claims contain numerous characteristics in combination. Those skilled in the art will also suitably consider the characteristics individually and unite them into other meaningful combinations.

DETAILED DESCRIPTION OF THE PREFERRED EMBODIMENTS

Figure 1:
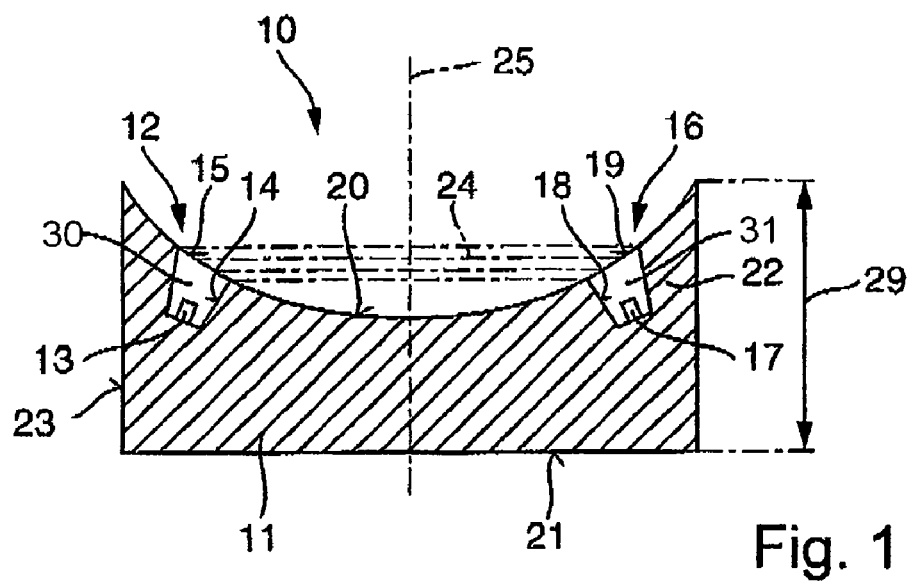
FIG. 1, is a longitudinal section through a preferred sensor device with a curved end face.

In the figures, parts that are the same or parts that remain essentially the same are basically provided with the same reference numerals.

FIG. 1 is a longitudinal section through a preferred sensor device 10 with a concavely curved end face 20. The sensor device 10 has a transmitter unit 12 situated in a sensor body 11 and a receiver unit 16 associated with the transmitter unit 12 and situated in the sensor body 11. The transmitter unit 12 and the receiver unit 16 are situated opposite from each other at the end face 20, which is situated between the transmitter unit 12 and the receiver unit 16 and constitutes an outer boundary surface of the sensor body 11. Radiation emitted by the transmitter unit 12 exits the transmitter unit 12 through an exit surface 15 and enters the receiver unit 16 through an entrance surface 19. The exit surface 15 and entrance surface 19 constitute non-parallel obtuse angled test surfaces of the sensor device 10. The radiation emitted by the transmitter unit 12 in a beam path 24, for example infrared or radiation in the optical wavelength range, is used to detect a coating or soiling of the test surfaces 15, 19. A set of electronics 71, 72, shown schematically, can trigger the transmitter unit 12 and/or the receiver unit 16 respectively and can evaluate measurement signals from the receiver unit 16 in an intrinsically known fashion.

Figure 6:
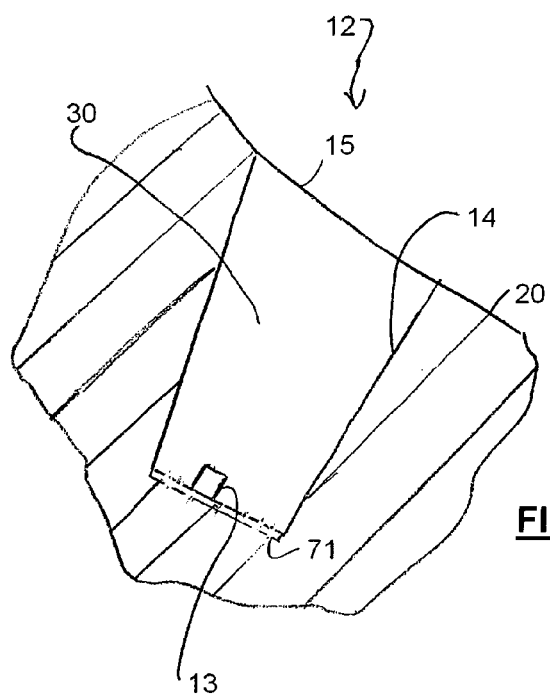
FIG. 6, is an enlargement of a portion of FIG. 1, and FIG. 7, is an enlargement of another portion of FIG. 1.
Figure 7:
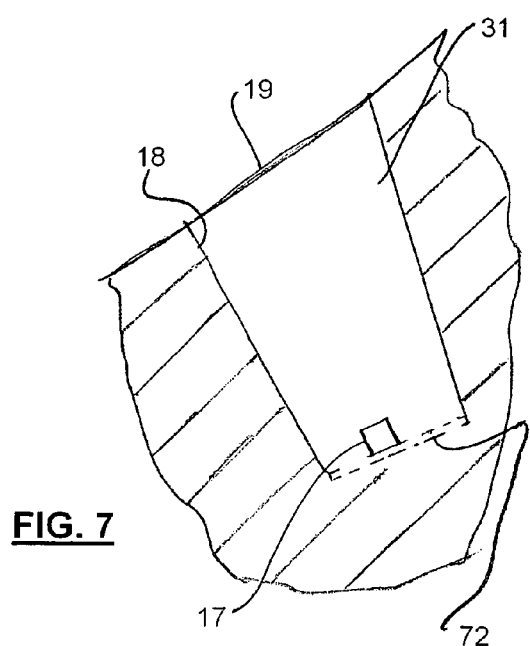

Referring additionally to FIGS. 6 and 7, the transmitter unit 12 and the receiver unit 16 are each preferably embodied in the form of an injection molded part in which a radiation transmitter 13 is integrated into the transmitter unit 12 and a radiation receiver 17 is integrated into the receiver unit 16.

The transmitter unit 12 and the receiver unit 16 are situated axially symmetrical to a symmetry axis 25. The radiation transmitted from the transmitter unit 12 to the receiver unit 16 travels essentially outside the sensor body 11. The transmitter unit 12 has a radiation source with an integrated optical device; the transmitter unit 12 has a radiation transmitter 13 that is encompassed in close proximity by an optically effective surface 14; and a radiation-guiding body 30 is provided inside the optically effective surface 14. The radiation-guiding body 30 is situated separate from the actual sensor body 11 so that the transmitter unit 12 is inserted into the sensor body 11 more or less as a module, particularly in the form of an injection molded part.

The receiver unit 16 is analogously designed and includes a radiation receiver 17 with an integrated optical device; the receiver unit 16 is likewise encompassed in close proximity by an optically effective surface 18 that contains a radiation-guiding body 31 separate from the sensor body 11. Radiation emitted by the radiation transmitter 13 is reflected against the optically effective surface 14, conveyed by the radiation-guiding body 30, and exits from the transmitter unit 12 via an exit surface 15. Correspondingly, radiation striking an entrance surface 19 of the receiver unit 16 is conveyed through the light-guiding body 31 and likewise, through reflection against the optically effective surface 18, to the radiation receiver 17. The receiver unit 16 is in particular embodied in the form of an injection molded part.

In the beam path 24, the radiation is sent from the transmitter unit 12 to the receiver unit 16 in the form of a radiation beam; inside the light-guiding body 30, the optics of the transmitter unit 12 correspondingly deflect, parallelize, and concentrate the transmission radiation of the radiation transmitter 13 and transmit this radiation through its exit surface 15. The exit surface 15 can be suitably structured for this, for example after the fashion of a Fresnel lens. The optics, in particular the optically effective surface 14, are embodied so that the radiation only exits in the direction of the receiver unit 16. The light-guiding body 31 of the receiver unit 16 contains a corresponding set of suitable optics that conveys the radiation arriving through its entrance surface 19 to the radiation receiver 17. Here, too, the entrance surface 19 can be suitably structured.

The transmitter unit 12 and the receiver unit 16 are situated in a region 22 close to the surface of the end face 20. The exit surface 15 of the transmitter unit 12 and/or the entrance surface 19 of the receiver unit 16 are essentially flush with the end face 20. The end face 20 is concavely curved in a fashion suitable to the transmitter unit 12 and receiver unit 16; the form of this curvature is arbitrary: it can, for example, be parabolic or spherical.

A circumference surface 23 of the sensor body 11 is situated outside the beam path 24 and can also be arbitrarily shaped and embodied. By contrast with the prior art, a deflection or even a total reflection of the radiation against the circumference surface 23 is not necessary. The back 21 of the sensor body 11, too, is uninvolved in the diffusion and/or reflection of the radiation.

The sensor body 11 is embodied as disk-shaped, for example, as a result of which, its diameter 28 is distinctly greater than its height 29.

Figure 2:
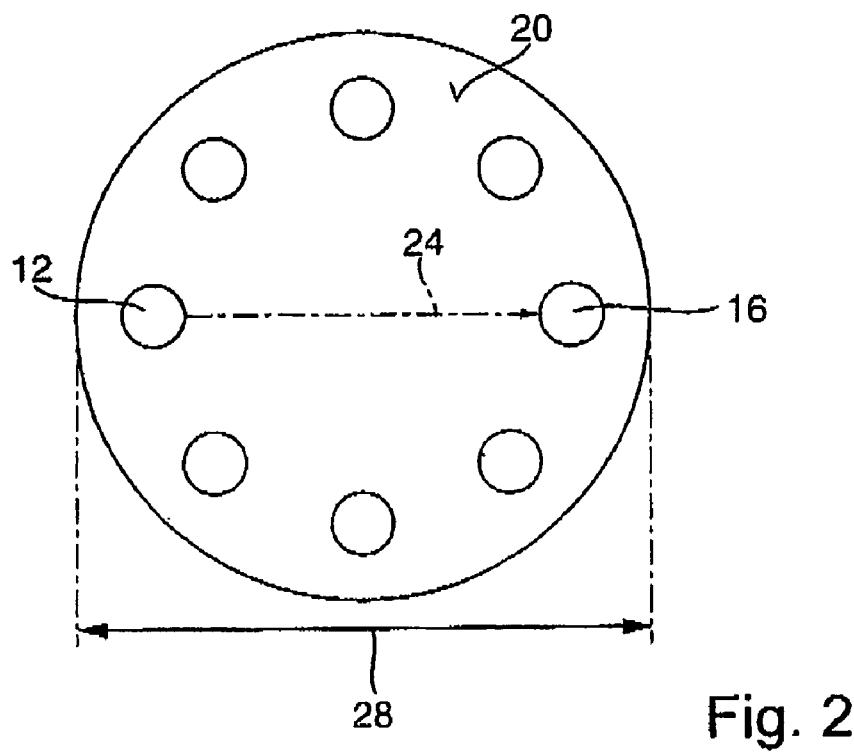
FIG. 2, is a top view of a preferred sensor device with a number of transmitter units and receiver units.

FIG. 2 is a top view of a preferred sensor device 10 with a number of transmitter units 12 and receiver units 16 situated opposite each other in pairs, each pair being comprised of a transmitter unit 12 and the receiver unit 16 situated opposite it on the other side of the end face 20. The transmitter units 12 and receiver units 16 are arranged in a circle. Naturally, the transmitter units 12 and receiver units 16 can also be arranged in a different geometrical pattern, for example in a linear fashion. Of the number of transmitter units 12 and receiver units 16, only one transmitter unit 12 and one receiver unit 16, with a radiation beam traveling in the beam path 24 between them, are provided with reference numerals. The modular design of the transmitter units 12 and receiver units 16, in particular embodied in the form of injection molded parts with integrated radiation transmitters or radiation receivers and integrated optics, and the decoupling of the optically effective surfaces 14, 18 and light-guiding body 30, 31 from the sensor body 11 make it possible to sharply decrease the size of the sensor device 10.

Figure 3:
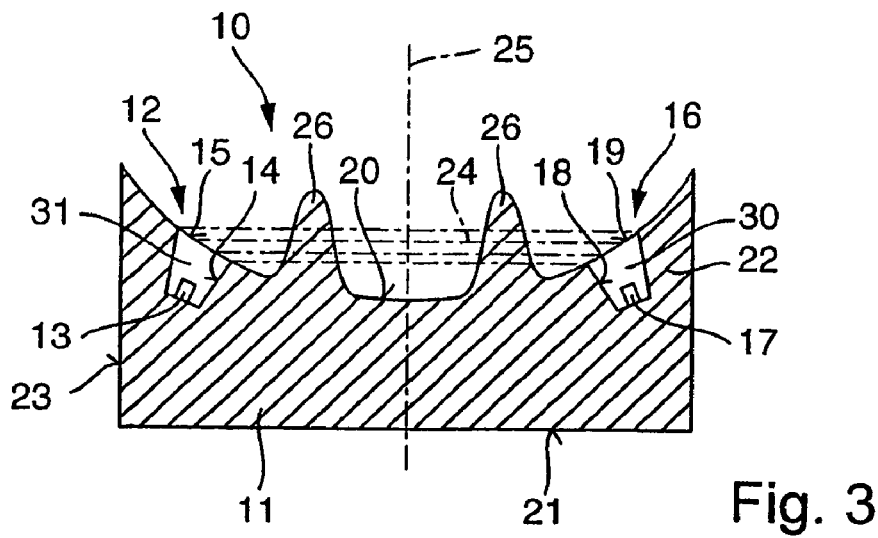
FIG. 3, is a longitudinal section through a preferred sensor device with an isolated protrusion as an additional test surface.
Figure 4:
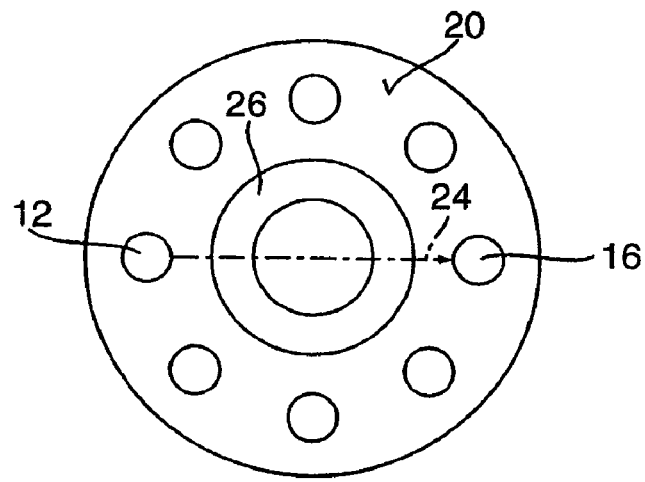
FIG. 4, is a top view of the preferred sensor device in FIG. 3, FIG. 5, is a top view of a sensor body with a polygonal cross section

FIG. 3 is a longitudinal section through a preferred sensor device 10 with two isolated protrusions 26 in an end face 20, and FIG. 4 is a top view of the sensor device 10 in FIG. 3. Analogous to FIG. 2, a number of opposing transmitter units 12 and receiver units 16 are provided in the end face 20. The protrusions 26 in FIG. 3 correspond to an annular bead around a symmetry axis 25; the lateral flanks of the protrusions 26 increase the size of the test surface. The protrusion 26 between the transmitter unit 12 and the receiver unit 16 is situated so that radiation traveling out from the transmitter unit 12 and directed toward the receiver unit 16 passes through the protrusion 26. The protrusion 26 is situated around the symmetry axis 25, with the transmitter unit 12 and the receiver unit 16 being situated on both sides of the symmetry axis 25. In particular, the transmitter unit 12 and receiver unit 16 are embodied in the form of injection molded parts with an integrated radiation transmitter or radiation receiver and integrated optics.

Figure 5:
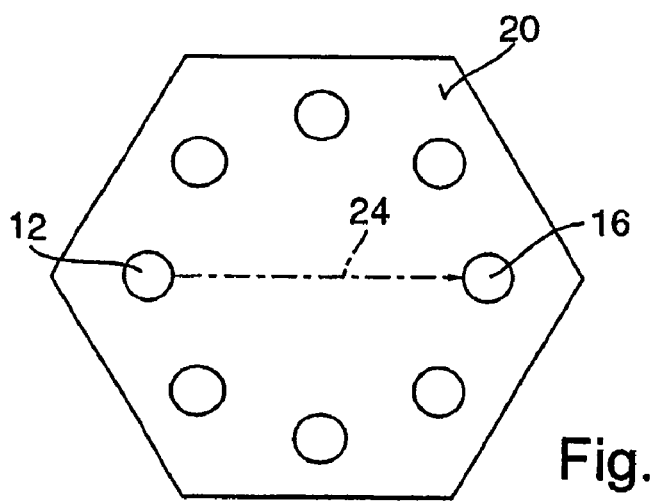

By way of example, FIG. 5 shows a top view of a sensor body 11 with a polygonal cross section. Naturally, the end face 20 can be provided with a test surface-enlarging structure analogous to the exemplary embodiment in FIGS. 3 and 4. Here, too, the transmitter unit 12 and receiver unit 16 are particularly embodied in the form of injection molded parts with an integrated radiation transmitter or radiation receiver and integrated optics.

The description of the invention is merely exemplary in nature and, thus, variations that do not depart from the gist of the invention are intended to be within the scope of the invention. Such variations are not to be regarded as a departure from the spirit and scope of the invention.

What is claimed:

1. An optoelectronic dust sensor device, comprising:
    at least one transmitter unit situated inside an injection molded sensor body;
    at least one receiver unit operably associated with said transmitter unit and situated inside said sensor body; and
    non-parallel test surfaces disposed between said transmitter unit and said receiver unit, and said test surfaces being constituted by an exit surface of said transmitter unit and an entrance surface of said receiver unit, wherein radiation transmitted from said transmitter unit to said receiver unit travels substantially in a beam path outside said sensor body; and
    wherein an end face of said sensor body includes an isolated protrusion, at least one isolated protrusion of said end face is situated between said transmitter unit and said receiver unit so that radiation emitted by said transmitter unit and oriented toward said receiver unit passes through said protrusion.

2. The sensor device according to claim 1, wherein the protrusion is situated around a symmetry axis, with the transmitter unit and receiver unit situated on opposite sides of the symmetry axis.

* * * * *